(12) United States Patent
Kawai

(10) Patent No.: US 9,421,974 B2
(45) Date of Patent: Aug. 23, 2016

(54) VEHICLE CONTROLLER

(71) Applicant: DENSO CORPORATION, Kariya, Aichi-pref. (JP)

(72) Inventor: Nobuharu Kawai, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/778,970

(22) PCT Filed: Mar. 12, 2014

(86) PCT No.: PCT/JP2014/056413
§ 371 (c)(1),
(2) Date: Sep. 21, 2015

(87) PCT Pub. No.: WO2014/148324
PCT Pub. Date: Sep. 25, 2014

(65) Prior Publication Data
US 2016/0039414 A1   Feb. 11, 2016

(30) Foreign Application Priority Data

Mar. 22, 2013   (JP) .................... 2013-060200

(51) Int. Cl.
*G06F 17/10* (2006.01)
*B60W 30/12* (2006.01)
(Continued)

(52) U.S. Cl.
CPC ........... *B60W 30/12* (2013.01); *B60W 30/0956* (2013.01); *B60W 40/04* (2013.01);
(Continued)

(58) Field of Classification Search
CPC .............. G06K 9/209; G06K 9/00791; G06K 9/00798; G06K 9/00812; H04N 5/232; H04N 5/217; H04N 5/243; B60W 50/14
USPC .......................................... 701/301, 514, 523
See application file for complete search history.

(56) References Cited

U.S. PATENT DOCUMENTS

2010/0060738 A1* 3/2010 Kataoka ................. G06K 9/209
    348/148
2011/0001640 A1* 1/2011 Kageyama ............ B60W 50/14
    340/995.24

(Continued)

FOREIGN PATENT DOCUMENTS

JP    2009-181411 A    8/2009
JP    2010-064513 A    3/2010

(Continued)

OTHER PUBLICATIONS

International Preliminary Report on Patentability; International Application No. PCT/JP2014/056413; Filed: Mar. 12, 2014 (with English translation).
International Search Report (translated version); International Application No. PCT/JP2014/056413, filed Mar. 12, 2014; 11 pages.

*Primary Examiner* — Redhwan K Mawari
(74) *Attorney, Agent, or Firm* — Knobbe, Martens, Olson & Bear, LLP

(57) ABSTRACT

When a temperature T detected by a thermistor built inside a camera unit exceeds a preset temperature T1, at least a process, among processes executed by a CPU built inside the camera unit, that relates only to LKA or AHB (such as a white line recognizing process) is stopped. Then, the amount of heat generated by the CPU decreases, whereby the temperature inside the housing also decreases. In this way, even when the PCS control is continuously performed by continuing electric power supply to an imaging element in the camera unit, performance of the imaging element can be maintained in some cases, thus allowing the electric power supply to the imaging element to continue in a satisfactory manner for a long period.

3 Claims, 2 Drawing Sheets

(51) Int. Cl.
*H04N 5/369* (2011.01)
*B60W 30/095* (2012.01)
*B60W 40/04* (2006.01)
*G06K 9/00* (2006.01)
*H04N 5/225* (2006.01)
*H04N 5/335* (2011.01)

(52) U.S. Cl.
CPC .......... *G06K9/00805* (2013.01); *H04N 5/2252* (2013.01); *H04N 5/335* (2013.01); *H04N 5/3698* (2013.01); *B60W 2420/42* (2013.01); *B60W 2550/10* (2013.01); *B60W 2710/20* (2013.01)

(56) References Cited

U.S. PATENT DOCUMENTS

2012/0293657 A1  11/2012  Kataoka et al.
2016/0039414 A1*  2/2016  Kawai .................. H04N 5/3698
                                           701/28

FOREIGN PATENT DOCUMENTS

| JP | 2010-143387 A | 7/2010 |
| JP | 2012-131466 A | 7/2012 |
| JP | 2012-240524 A | 12/2012 |
| WO | 2014/148324 A1 | 9/2014 |

\* cited by examiner

VEHICLE CONTROLLER

CROSS-REFERENCE TO RELATED APPLICATION

This application is based on and claims the benefit of priority from earlier Japanese Patent Application No. 2013-060200 filed Mar. 22, 2013, the description of which is incorporated herein by reference.

BACKGROUND OF THE INVENTION

1. Technical Field

This invention relates to a vehicle controller controlling a vehicle by using an image sensor capturing an image of the surrounding of the vehicle.

2. Related Art

Conventionally, various vehicle controllers have been suggested, the vehicle controllers controlling vehicles by using image sensors capturing images of the surroundings of the vehicles. For example, a device which recognizes lane markers separating traveling lanes on the basis of the image has been suggested. The device applies rotation torque to a steering shaft such as to prevent deviation from the lane. Such a process for recognizing the lane marker is easily affected by thermal noise. Accordingly, if the temperature of the image sensor exceeds a threshold, it is suggested the electric power supply to the image sensor is stopped (for example, see PTL 1).

CITATION LIST

Patent Literature

[PTL 1] JP-A-2010-64513

SUMMARY

Technical Problem

The temperature increase of the image sensor is affected also by heat from a controller portion and the like disposed with the image sensor in a common casing. However, in the PTL 1, suppressing heat from the controller portion and continuing the electric power supply to the image sensor is not considered at all. Accordingly, the present disclosure has an object to provide a vehicle controller which can continue electric power supply to an image sensor for a long time by reducing heat from a controller portion disposed with the image sensor in a common casing.

Solution to Problem

In a vehicle controller of this disclosure made for solving the above-described object, an image sensor and a controller portion are disposed in the same casing. The image sensor captures an image of surroundings of a vehicle. The controller portion performs a plurality of types of processes for processing the image captured from the image sensor. A temperature detector portion detects a temperature of the inside of the casing or a temperature of the image sensor, and stopping means stops a part of the processes executed by the controller portion, if the temperature detected by the temperature detector portion exceeds a predetermined threshold. This reduces the heat from the controller portion, which causes the temperature of the casing and the temperature of the image sensor to lower. As a result, even if electric power supply to the image sensor is continued, performance of the image sensor can sometimes be maintained, and accordingly the electric power supply to the image sensor can be maintained well for a long time.

BRIEF DESCRIPTION OF THE DRAWINGS

In the accompanying drawings:
In the accompanying drawings.

DETAILED DESCRIPTION OF PREFERRED EMBODIMENTS

Configuration of Embodiment

Figure 1:
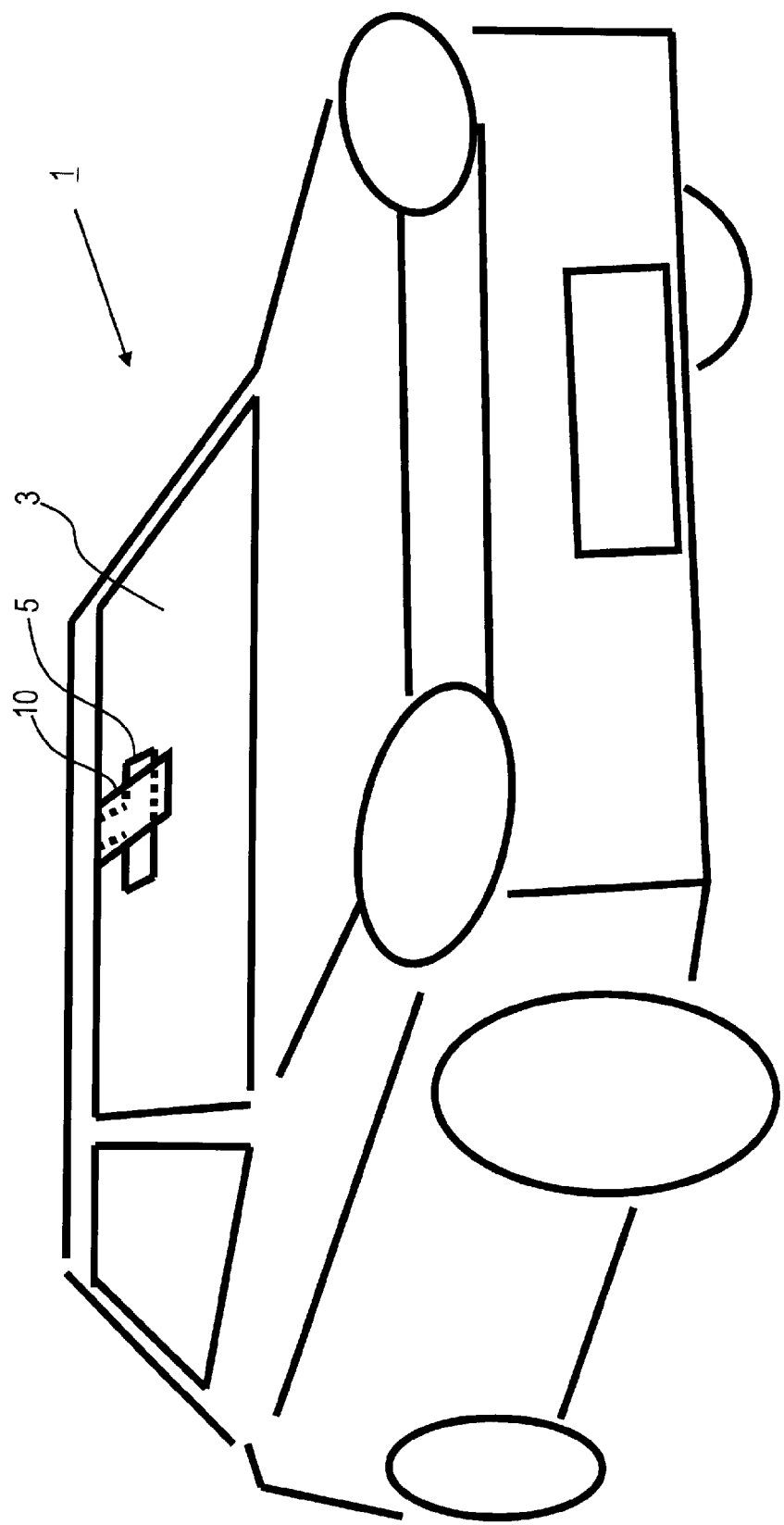
FIG. 1 is a schematic perspective view showing a placement of an camera unit according to an embodiment.

Hereinafter is described an embodiment with the drawings. As shown in FIG. 1, a camera unit 10 configures a part of a vehicle controller of this embodiment. The camera unit 10 is attached to a top center of a windshield 3 of a vehicle 1 near a base of a rear-view mirror 5 behind the rear-view mirror.

Figure 2:
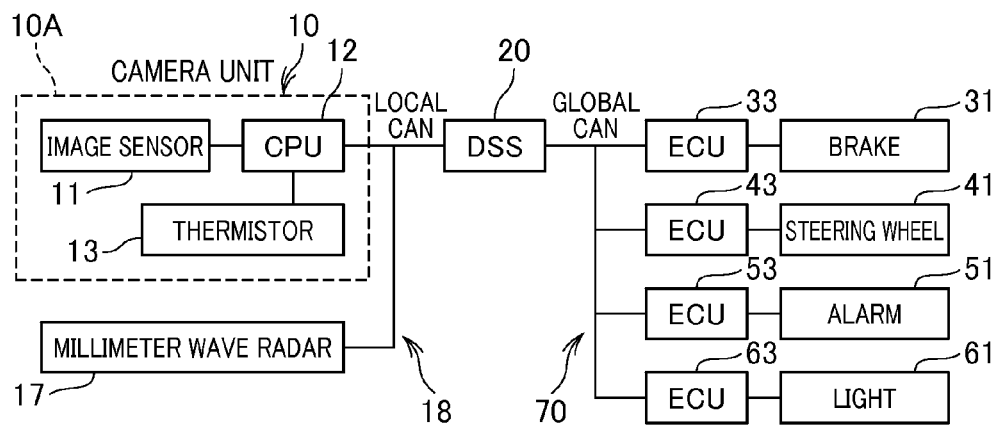
FIG. 2 is a block diagram showing a configuration of a vehicle controller using the camera unit.

As shown in FIG. 2, in addition to an image sensor 11 such as a CCD, a CPU 12 and a thermistor 13 are provided inside a casing 10A of the camera unit 10. The CPU 12 executes processes for controlling the image sensor 11. In this embodiment, the CPU 12 performs a plurality of types of image processing on the basis of image signals inputted from the image sensor 11, and obtains information on peripheral objects of the vehicle and status information of the own vehicle. Further, the CPU 12 executes a stop process described below on the basis of a temperature signal of the inside of the casing 10A, the temperature signal inputted from the thermistor 13. The thermistor 13 is provided at a position where the temperature of the inside of the casing 10A, preferably the temperature of the image sensor 11 is detectable.

The vehicle controller of this embodiment has a DSS ECU (driver support system electronic control unit: referred to as simply DSS, below). The DSS 20 is connected through a local CAN 18 to sensors detecting environment surrounding the vehicle, such as a camera unit 10, a millimeter-wave radar 17 detecting obstacles ahead of the vehicle 1, and the like. The DSS 20 is connected to operation devices which the driver operates through their controllers. The DSS 20 controls the operation device depending on the environment surrounding the vehicle, thereby supporting driving operation of the driver.

Specifically, the DSS 20 of this embodiment is connected to an ECU 33 controlling a brake 31, another ECU 43 controlling a steering wheel 41, another ECU 53 controlling an alarm device 51, and another ECU 63 controlling a headlight 61 through a global CAN 70.

Control in this Embodiment

Thus, the vehicle controller of this embodiment configured as shown in the block diagram of FIG. 2 executes control, such as PCS (forward crash avoidance), LKA (lane keep assist), and AHB (automatically light High/Low switching). Now is described an overview of each control.

PCS: The control is for automatically activating the brake 31 to prevent collision when the vehicle 1 almost collide an obstacle ahead of the vehicle 1. In the control, the CPU 12 of the camera unit 10 calculates the distance to the obstacle such as a human, a vehicle and the like, the position, and the size of the obstacle. The DSS 20 instructs the ECU 33 on activating timing of the brake 31 or strength of the braking force on the basis of the information from the camera unit 10 and the millimeter wave radar 17. The ECU 33 sends instructions to actuators for activating the brake 31.

LKA: The control is for giving the steering wheel 41 an opposing force to return the vehicle 1 to the original lane, when the vehicle 1 is about to deviate from the lane (guideway). In the control, the CPU 12 of the camera unit 10 calculates a deviation degree of the own vehicle from the center of the traveling lane, i.e. how much the own vehicle is deviated from the center or whether the own vehicle is deviated from the white line, on the basis of the image captured by the image sensor 11. In response to the process by the CPU 12, the DSS 20 provides the instruction for giving the opposing force to the steering wheel 41, or provides an instruction for issuing an alarm when the vehicle 1 deviates from the lane. In response to the instruction, the ECU 43 sends an instruction to actuators for actuating the steering wheel 41, and the ECU 53 sends an instruction to the alarm device 51.

AHB: The control is for automatically switching between High beam and Low beam when a leading vehicle or an oncoming appears. In the control, the CPU 12 of the camera unit 10 calculates the distance to and the position of the leading vehicle or oncoming vehicle on the basis of the image captured by the image sensor 11. In response to the process by the CPU 12, the DSS 20 determines whether it should set the headlight to High beam or Low beam, and the ECU 63 instructs the headlight 61 to switch between High beam and Low beam.

It should be noted that the following Table 1 shows assignments which the controllers (the CPU 12 of the camera unit 10, the DSS 20 and the ECUs 33 to 63) have in each control of the PCS, LKA and AHB.

TABLE 1

|  | Camera unit's assignment | DSS's assignment | Corresponding ECU's assignment |
|---|---|---|---|
| PCS Forward crash avoidance Pre-Crash-Safety | Calculate the distance to, the position and size of obstacles such as a human, a vehicle and the like | Provide the instruction on braking timing and braking force | Instruct the brake |
| LKA Lane Keep Assist Lane-Keep-Assist | Deviation degree of the own vehicle from the center of the traveling lane (how much the own vehicle is deviated from the center or whether the own vehicle is deviated from the white line) | Instruction the steering wheel on the opposing force, Alarm when the deviation occurs | Instruct the steering wheel Instruct alarm device |
| AHB Automatically light High/Low switching Auto-High-Beam | Distance to and position of a leading or oncoming vehicle | Determine whether the light is switched to High or Low | Instruct the light |

Here, if the internal temperature of the casing 10A detected by the thermistor 13 rises, it becomes difficult to ensure performance of the image sensor 11 because of an effect of thermal noise and the like. Accordingly, when an ignition switch of the vehicle 1 is turned on, the CPU 12 executes the processes shown in FIG. 3 on the basis of the programs stored on the ROM.

Figure 3:
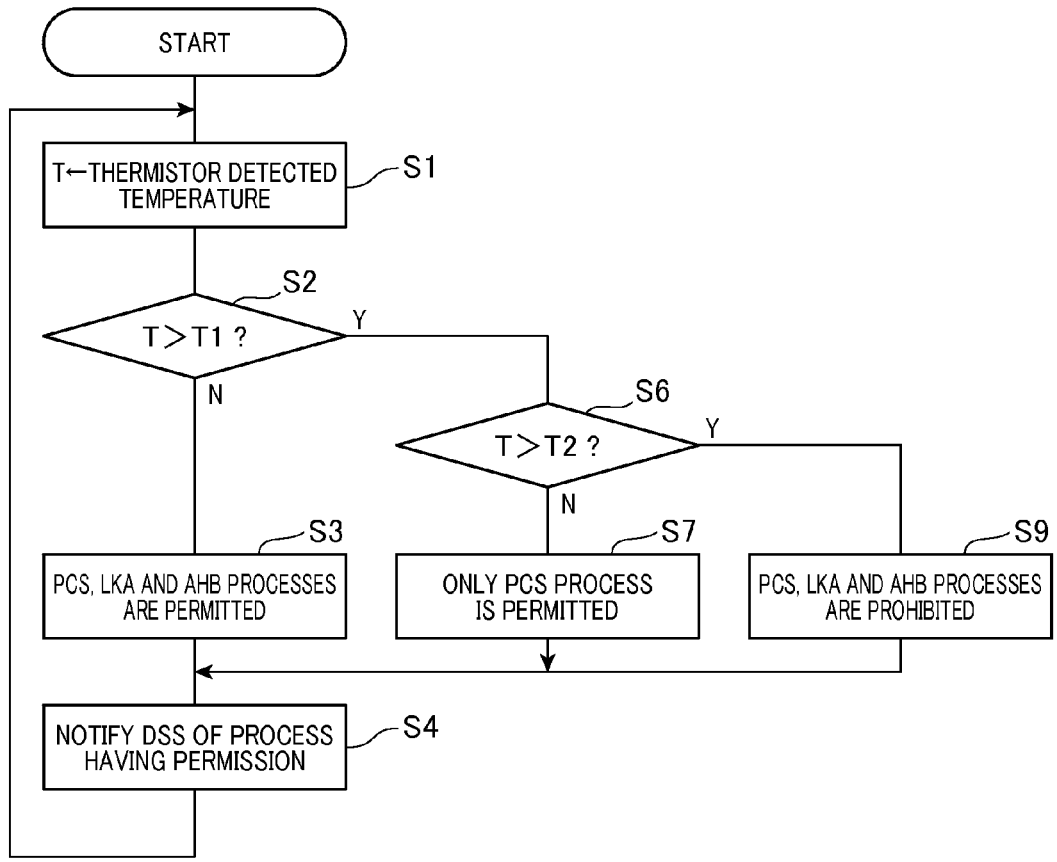
FIG. 3 is a flow chart showing processes executed in the vehicle controller.

As shown in FIG. 3, when the flow is initiated, at first, the temperature detected by the thermistor 13 is defined as a temperature T in S1 (S means a step: the same is applied below). In the next S2, it is determined whether the temperature T is higher than a temperature T1 predetermined as a temperature where all the controls can be performed stably. In a case of T≤T1 (S2:N), the flow proceeds to S3.

In S3, of the processes in the CPU 12, all the PCS, LKA and AHB processes are permitted. In S4, the permitted processes are notified to the DSS 20, thereafter the flow proceeds to S1. As a result, if the temperature T is low enough (S2: N), the CPU 12 cooperates with the DSS 20 and the like to execute all the PCS, LKA and AHB controls.

On the other hand, if the temperature T is higher than the temperature T1 (S2: Y), the flow proceeds to S6, and it is determined whether the temperature T is higher than a temperature T2 which is predetermined to be higher than the T1. In a case of T≤T2 (S6: N), the flow proceeds to S7, only the PCS process among the processes by the CPU 12 is permitted, and the flow proceeds to S4. That is, stepwise threshold temperatures are set to reduce the load of the CPU 12 in step wise manner. In a case of T>T2 (S6: Y), the flow proceeds to S9, all the PCS, LKA and AHB processes are stopped, and the flow proceeds to S4. In this embodiment, the temperature T2 is set on the basis of the operation guarantee temperature of the image sensor 11. That is, even if the temperature in the CPU12 is within the operation guarantee temperature of the CPU 12, when the operation guarantee temperature of the image sensor 11 is lower than that of the CPU 12, the stopping process is performed.

[Advantageous Effects of the Embodiment and Modifications]

In this embodiment, if the temperature T detected by the thermistor 13 exceeds the predetermined temperature T1 (S2: Y), of the processes which the CPU 12 executes, at least only the LKA or AHB process (for example, recognition process of white lines) is stopped (S7). This reduces the heat from the CPU 12, which causes the internal temperature of the casing 10A and the temperature of the image sensor 11 to lower. As a result, even if electric power supply to the image sensor 11 is kept to continue the control of the PCS, performance of the image sensor 11 can sometimes be maintained, accordingly the electric power supply to the image sensor 11 can be maintained sufficiently for a long time. This can substantially increase the operation guarantee temperature of the camera unit 10 for executing the control of the PCS.

Further, in this embodiment, because the process permitted for the CPU1 2 is notified to the DSS 20 (S4), the DSS 20 can be prevented from mistaking the processes. If the temperature T exceeds the temperature T2 which is set to be higher than the temperature T1 (S6: Y), all processes in the CPU 12 are stopped. This can reduce the internal temperature T of the casing 10A and the temperature of the image sensor 11 further quickly.

In this embodiment, the CPU 12 corresponds to the first controller portion, stopping means and notifying means. Thermistor 13 corresponds to the temperature detector portion, the DSS 20 corresponds to second controller portion, respectively. Of the processes by the CPU 12, S7 and S9 correspond to the stopping means, and S4 corresponds to notifying means, respectively. The present invention is not limited to the above-described embodiment, and modifications can be made without departing from the scope of the present invention. For example, the CPU 12 may execute control processes other than the PCS, LKA and AHB, and an order of the processes to be stopped may be changed. However, in the above-described embodiment, since, of the three PCS, LKA and AHB controls, the PCS control is performed to the last, safety of the vehicle 1 can be better ensured.

REFERENCE SIGNS LIST

1 . . . Vehicle
10 . . . Camera unit
10A . . . Casing
11 . . . Image sensor
12 . . . CPU
13 . . . Thermistor
20 . . . DSS
31 . . . Brake
33, 43, 53, 63 . . . ECU
41 . . . Steering wheel
51 . . . Alarm device
61 . . . Headlight

The invention claimed is:
1. A vehicle controller, comprising:
a casing;
an image sensor disposed in the casing, the image sensor capturing an image of an area ahead of a vehicle;
a temperature detector detecting a temperature of the inside of the casing or a temperature of the image sensor; and
a central processor disposed in the casing, the central processor comprising:
a first controller portion executing a first, a second and a third processes for the image captured by the image sensor, the first process being a control for preventing the vehicle from colliding with obstacles ahead thereof, the second process being a control for preventing the vehicle from deviating from a traveling lane, the third process being a control for switching an irradiation state of a light of the vehicle;
and
stopping portions stopping the second and third processes when the temperature detected by the temperature detector exceeds a first predetermined threshold, and further stopping the first process too when the temperature exceeds a second threshold set to be larger than the first threshold.
2. The vehicle controller according to claim 1, the central processor further comprising:
notifying portions notifying a second controller portion provided outside the casing of the process which the controller portion has stopped.
3. The vehicle controller according to claim 1, wherein the stopping portions stopping a part of the processes by the controller portion such that the temperature of the image sensor is kept equal to or lower than its operation guarantee temperature.

\* \* \* \* \*